United States Patent
Nakamura et al.

(10) Patent No.: US 9,118,786 B2
(45) Date of Patent: Aug. 25, 2015

(54) IMAGE CAPTURE-DISPLAY DEVICE

(71) Applicant: Panasonic Intellectual Property Corporation of America, Torrance, CA (US)

(72) Inventors: Hideyuki Nakamura, Fukuoka (JP); Tadanori Tezuka, Fukuoka (JP); Yoshiteru Tanaka, Fukuoka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/293,414

(22) Filed: Jun. 2, 2014

(65) Prior Publication Data

US 2014/0362164 A1 Dec. 11, 2014

(30) Foreign Application Priority Data

Jun. 6, 2013 (JP) ................................. 2013-119675

(51) Int. Cl.
*H04N 7/14* (2006.01)
*H04N 1/00* (2006.01)

(52) U.S. Cl.
CPC ........... *H04N 1/00129* (2013.01); *H04N 7/144* (2013.01)

(58) Field of Classification Search
CPC ......... H04N 7/15; H04N 7/147; H04N 7/142; H04N 7/152; H04N 7/141; H04N 1/00217; H04N 1/00225; H04N 1/00244
USPC ......................... 348/14.01, 14.07, 14.08, 14.1
See application file for complete search history.

(56) References Cited

U.S. PATENT DOCUMENTS

| | | | |
|---|---|---|---|
| 7,420,585 B2* | 9/2008 | Fredlund et al. ................. 348/61 |
| 2009/0278913 A1* | 11/2009 | Rosenfeld et al. .......... 348/14.16 |
| 2012/0249724 A1* | 10/2012 | Morrison .................... 348/14.16 |
| 2012/0257004 A1* | 10/2012 | Smith et al. ................ 348/14.16 |
| 2012/0287223 A1* | 11/2012 | Zhang et al. ............... 348/14.08 |
| 2013/0155176 A1* | 6/2013 | Paripally et al. ........... 348/14.07 |
| 2014/0098175 A1* | 4/2014 | Nagano ...................... 348/14.01 |
| 2014/0098349 A1* | 4/2014 | Nagasawa et al. .............. 353/31 |

FOREIGN PATENT DOCUMENTS

| | | |
|---|---|---|
| JP | 2007-298547 A | 11/2007 |
| JP | 2008-205839 A | 9/2008 |

* cited by examiner

*Primary Examiner* — Quoc D Tran
(74) *Attorney, Agent, or Firm* — Renner, Otto, Boisselle & Sklar, LLP

(57) ABSTRACT

An image capture-display device includes: a light source that emits a light beam falling within a first wavelength range; an optical system arranged on the optical path of the light beam falling within the first wavelength range emitted from the light source and configured to reflect the light beam falling within the first wavelength range and transmit a light beam falling within a second wavelength range; a display panel arranged on the optical path of the light beam falling within the first wavelength range emitted from the light source and reflected by a dichroic mirror and configured to transmit the light beams falling within the first and second wavelength ranges; and an imaging device arranged opposite from the display panel with respect to the optical system and configured to receive the light beam falling within the second wavelength range transmitted through the display panel and the optical system.

17 Claims, 12 Drawing Sheets

IMAGE CAPTURE-DISPLAY DEVICE

BACKGROUND

1. Technical Field

The present application relates to an image capture-display device which can capture and display video simultaneously.

2. Description of the Related Art

Recently, remote communications systems, digital mirror systems, and other systems which can capture and display video simultaneously have become more and more popular. According to these systems, however, the person who is watching video on a display (i.e., the user) and the person who is presented on the display (i.e., either a person at a remote location or the user him- or herself) have different lines of sight, which is a problem. The reason is that the video on the display has been captured by shooting a person who faces the display screen straight on with a camera which is arranged around the display. Thus, to make their lines of sight agree with each other, the person should be shot from behind the display while the video is being presented on the display. Japanese Laid-Open Patent Publication No. 2007-298547 discloses a liquid crystal display device with such a configuration.

SUMMARY

According to the method disclosed in Japanese Laid-Open Patent Publication No. 2007-298547, however, a complicated control should be performed on multiple light sources and the liquid crystal display in order to capture and display video simultaneously.

The present disclosure provides an image capture-display device which can capture and display video simultaneously without performing such a complicated control.

To overcome the problem described above, an image capture-display device according to an aspect of the present disclosure includes: a light source which is configured to emit a light beam falling within a first wavelength range; an optical system which is arranged on the optical path of the light beam falling within the first wavelength range that has been emitted from the light source and which is configured to reflect at least partially the light beam falling within the first wavelength range and transmit at least partially a light beam falling within a second wavelength range that is different from the first wavelength range; a display panel which is arranged on the optical path of the light beam falling within the first wavelength range that has been emitted from the light source and reflected by the optical system and which is configured to transmit the light beam falling within the first wavelength range and the light beam falling within the second wavelength range; and an imaging device which is arranged opposite from the display panel with respect to the optical system and which is configured to receive the light beam falling within the second wavelength range that has been transmitted through the display panel and the optical system and output an image signal.

This general and particular aspect can be implemented as a system, a method, a computer program or a combination thereof.

An image capture-display device according to the present disclosure can capture and display video simultaneously without performing any complicated control.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, embodiments of the present disclosure will be described. Before specific embodiments are described, however, first of all, the idea that forms the basis of the technique of the present disclosure will be described. In this description, "light" is supposed to include not only visible light but also infrared and ultraviolet rays, which will be referred to herein as "infrared light" and "ultraviolet light", respectively.

Figure 11:
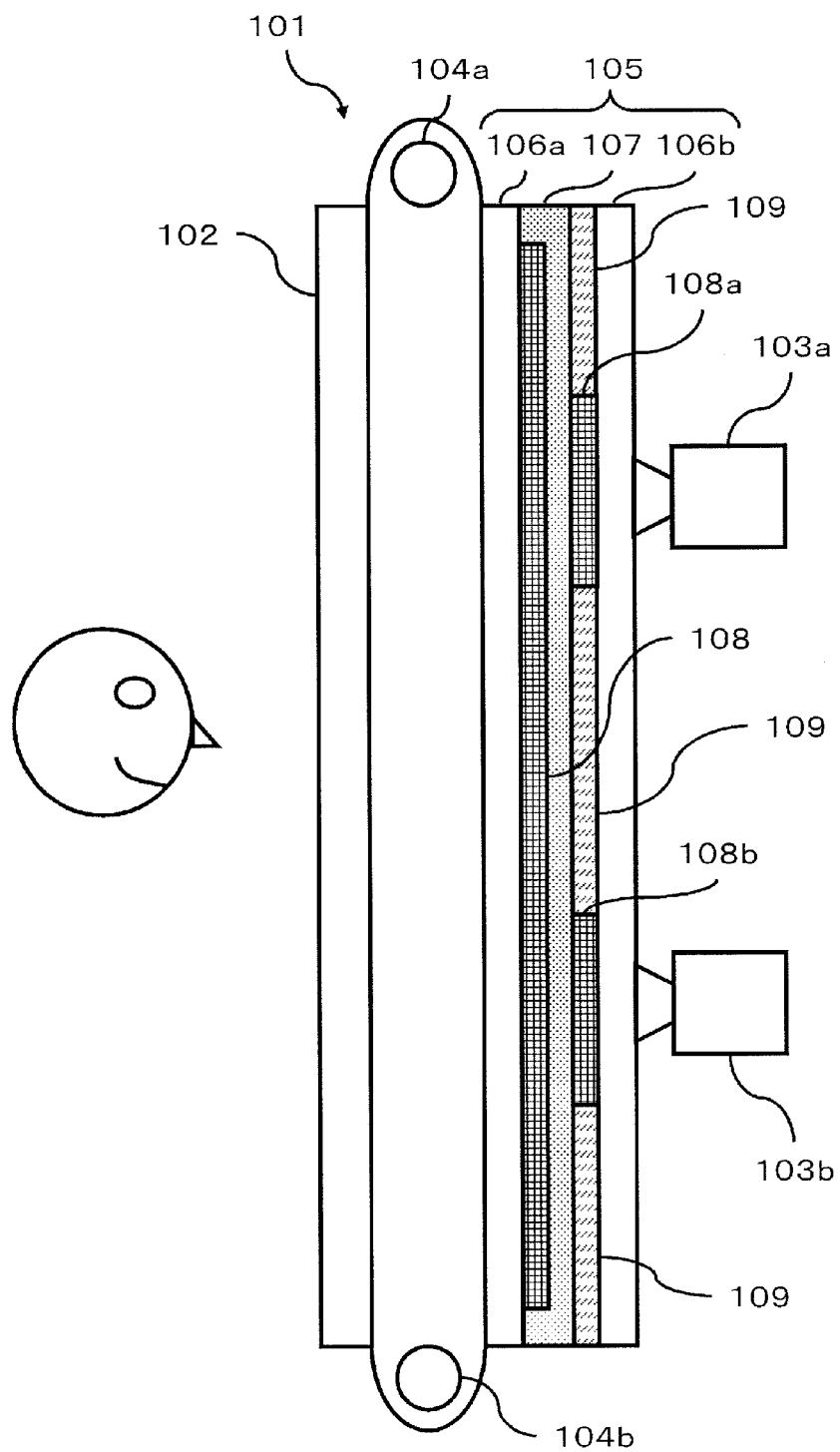
FIG. 11 illustrates a configuration for a liquid crystal display device as a comparative example.

FIG. 11 schematically illustrates a liquid crystal display device, of which the configuration is similar to that of the device disclosed in Japanese Laid-Open Patent Publication No. 2007-298547. This liquid crystal display device 101 includes a transmissive LCD panel 102 with a plurality of color filters that are arranged in columns and rows, two fluorescent tubes 104a, 104b, a scattering panel 105, and two infrared cameras 103a, 103b which are sensitive to light having a longer wavelength than visible light (i.e., infrared light).

A liquid crystal layer 107 and a reflective film 109 are stacked one upon the other between the two glass substrates 106a and 106b of the scattering panel 105. A transparent electrode 108 is embedded in the liquid crystal layer 107 and two transparent electrodes 108a and 108b are embedded in the reflective film 109. By applying a voltage to between the transparent electrode 108 and the transparent electrodes 108a, 108b, the modes can be changed into a transmission mode in which light can be transmitted through portions of the liquid crystal layer 107 which face those transparent electrodes 108a, 108b. And by changing the modes into the transmission mode, light is incident on the infrared cameras 103a and 103b which are arranged behind the transparent electrodes 108a and 108b, respectively, thus making those cameras 103a and 103b ready to capture an image.

The light emitted from the fluorescent tubes 104a and 104b is reflected toward the transmissive LCD panel 102 mainly by the reflective film 109. This light functions as backlight.

The infrared light has the property of being transmitted through the transmissive LCD panel 102 including a plurality of color filters at a higher transmittance than the visible light is. That is why the infrared light that has been transmitted through the transmissive LCD panel 102 and the scattering panel 105 in the transmission mode can be received by the infrared cameras 103a and 103b which are arranged behind the transmissive LCD panel 102. As a result, an image can be displayed while being captured at the same time.

This liquid crystal display device 101 captures images using the two infrared cameras 103a, 103b alternately. Specifically, if that portion of the liquid crystal layer 107 that faces the transparent electrode 108a is in the transmission mode and if the fluorescent tube 104a has been turned OFF, this liquid crystal display device 101 captures an image using the infrared camera 103a. On the other hand, if that portion of the liquid crystal layer 107 that faces the transparent electrode 108b is in the transmission mode and if the fluorescent tube 104b has been turned OFF, this liquid crystal display device 101 captures an image using the other infrared camera 103b. In this manner, an image is supposed to be captured when the fluorescent tube arranged close to each of the infrared cameras 103a, 103b is in OFF state in order to reduce the noise to be generated when the infrared components included in the light emitted from the fluorescent tube enters the infrared camera 103a, 103b.

Thus, the display device 101 shown in FIG. 11 drives the set of the transparent electrode 108a, fluorescent tube 104a and infrared camera 103a and the set of the transparent electrode 108b, fluorescent tube 104b and infrared camera 103b alternately with each other. As a result, while video is being displayed on the transmissive LCD panel 102, the subject located closer to the display screen can be shot with the infrared cameras 103a and 103b which are arranged behind the transmissive LCD panel 102.

However, to capture the images, this display device 101 needs to control the transparent electrodes 108a, 108b, the fluorescent tubes 104a, 104b and the infrared cameras 103a, 103b in a complicated manner as described above. In addition, since the fluorescent tubes 104a and 104b are turned ON and OFF repeatedly, the video will look flickering, which is also a problem.

To overcome these problems, the present inventors perfected an image capture-display device with a novel configuration to be described below. Embodiments of the present disclosure can be outlined as follows.

(1) An image capture-display device according to an aspect of the present disclosure includes: a light source which is configured to emit a light beam falling within a first wavelength range; an optical system which is arranged on the optical path of the light beam falling within the first wavelength range that has been emitted from the light source and which is configured to reflect at least partially the light beam falling within the first wavelength range and transmit at least partially a light beam falling within a second wavelength range that is different from the first wavelength range; a display panel which is arranged on the optical path of the light beam falling within the first wavelength range that has been emitted from the light source and reflected by the optical system and which is configured to transmit the light beam falling within the first wavelength range and the light beam falling within the second wavelength range; and an imaging device which is arranged opposite from the display panel with respect to the optical system and which is configured to receive the light beam falling within the second wavelength range that has been transmitted through the display panel and the optical system and output an image signal.

(2) In one embodiment, the optical system is a dichroic mirror which has the property of reflecting the light beam falling within the first wavelength range and transmitting the light beam falling within the second wavelength range.

(3) In another embodiment, the optical system is a half mirror.

(4) In another embodiment, the light beam falling within the first wavelength range is visible light, and the light beam falling within the second wavelength range is either infrared light or ultraviolet light.

(5) In another embodiment, the light source is configured to emit the light beam falling within the first wavelength range and the light beam falling within the second wavelength range, and the device further includes an optical filter which is configured to transmit the light beam falling within the first wavelength range and not to transmit the light beam falling within the second wavelength range and which is arranged between the light source and the optical system.

(6) In another embodiment, the display panel is configured to display an image based on an image signal that has been supplied from the imaging device.

(7) In another embodiment, the image capture-display device further includes at least one illumination source which is arranged so as to irradiate a subject with the light beam falling within the second wavelength range.

(8) In another embodiment, the at least one illumination source is arranged beside the display panel.

(9) In another embodiment, the light beam falling within the first wavelength range is visible light and the light beam falling within the second wavelength range is infrared light, and the device further includes at least one color imaging device which is configured to receive visible light that has come from a subject and output at least one color image signal.

(10) In another embodiment, the image capture-display device further includes: an imaging controller which outputs a control signal to synchronize image capturing timings by the imaging device and the at least one color imaging device; and an image processor which generates a synthetic color image signal based on the image signal supplied from the imaging device and the at least one color image signal supplied from the at least one color imaging device.

(11) In another embodiment, the at least one color imaging device includes two color imaging devices.

(12) In another embodiment, the two color imaging devices are arranged symmetrically with respect to the center of the display panel.

(13) In another embodiment, the image capture-display device further includes at least one infrared light source which is arranged in the vicinity of the at least one color imaging device and which irradiates the subject with infrared light.

(14) In another embodiment, the light source includes a color display panel which displays a color image corresponding to the image displayed on the display panel.

(15) In another embodiment, the image capture-display device further includes a display controller which displays synchronized video on the color display panel and the display panel in the light source.

(16) In another embodiment, the image capture-display device further includes a communications circuit which is configured to transmit the image signal that has been supplied from the imaging device to a network and to receive another image signal via the network. The display panel is configured to display an image based on that another image signal that has been received by the communications circuit.

(17) A remote communications system according to an aspect of the present invention includes: the image capture-display device according to any of the embodiments described above; and a router which connects the image capture-display device to another image capture-display device over a network.

Hereinafter, the basic configuration and operation according to an embodiment of the present disclosure will be described.

Figure 1:
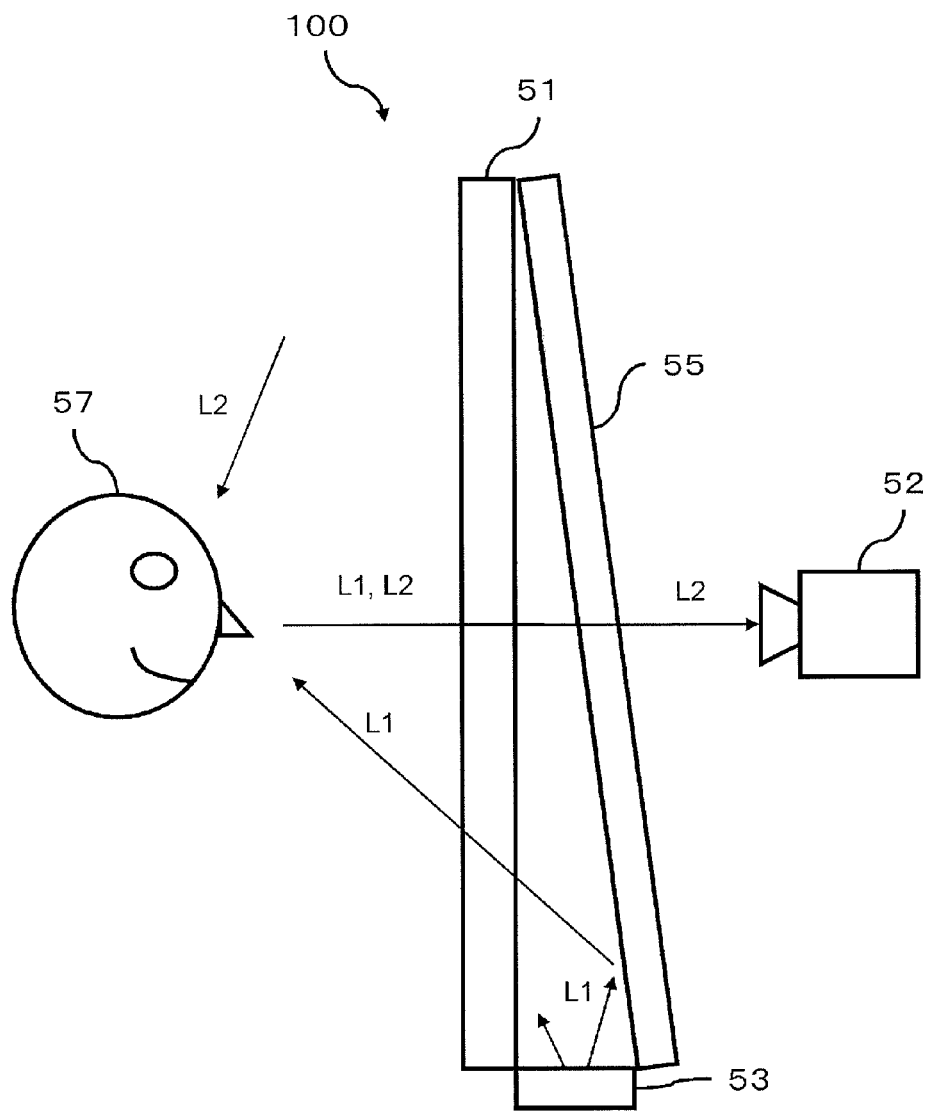
FIG. 1 illustrates an exemplary basic configuration for an image capture-display device according to an embodiment of the present disclosure.

FIG. 1 illustrates an exemplary basic configuration for an image capture-display device 100 according to an embodiment of the present disclosure. The image capture-display device 100 illustrated in FIG. 1 includes: a light source 53 which is configured to emit a light beam falling within a first wavelength range; an optical system 55 which is arranged on the optical path of the light beam falling within the first wavelength range that has been emitted from the light source 53 and which is configured to reflect at least partially the light beam falling within the first wavelength range and transmit at least partially a light beam falling within a second wavelength range that is different from the first wavelength range; a display panel (display) 51 which is arranged on the optical path of the light beam falling within the first wavelength range that has been emitted from the light source 53 and reflected by the optical system (dichroic mirror) 55 and which is configured to transmit the light beam falling within the first wavelength range and the light beam falling within the second wavelength range; and an imaging device 52 which is arranged opposite from the display panel 51 with respect to the optical system 55 and which is configured to receive the light beam falling within the second wavelength range that has been transmitted through the display panel 51 and the optical system 55 and output an image signal.

The first wavelength range may be visible light wavelength range, for example, and the second wavelength range may be infrared light wavelength range, for example. However, this is just an example as will be described later. In FIG. 1, the light beam falling within the first wavelength range is indicated by L1 and the light beam falling within the second wavelength range is indicated by L2.

The light beam L1 falling within the first wavelength range that has been emitted from the light source 53 is reflected from the optical system 55 and transmitted through the display panel 51. This light beam L1 serves as backlight for the display panel 51. As a result, the user (subject) 57 can view the video being displayed on the display panel 51.

If the light beam L2 falling within the second wavelength range that has come externally or from an illumination source (not shown) is incident on the user 57, the light beam L2 is transmitted through the display panel 51 and the optical system 55 and then incident on the imaging device 52, which is sensitive to the light beam L2 falling within the second wavelength range. Thus, the imaging device 52 generates and outputs an image signal in accordance with the intensity of the light beam L2 received. That image signal may be processed by an image processor (not shown) and then displayed as an image on the display panel 51. Alternatively, the image signal may also be transmitted to an external network through a communications circuit (not shown), sent to an image capture-display device provided at another site, and then displayed as an image there.

Hereinafter, more specific embodiments of the present disclosure will be described.

Embodiment 1

Figure 2:
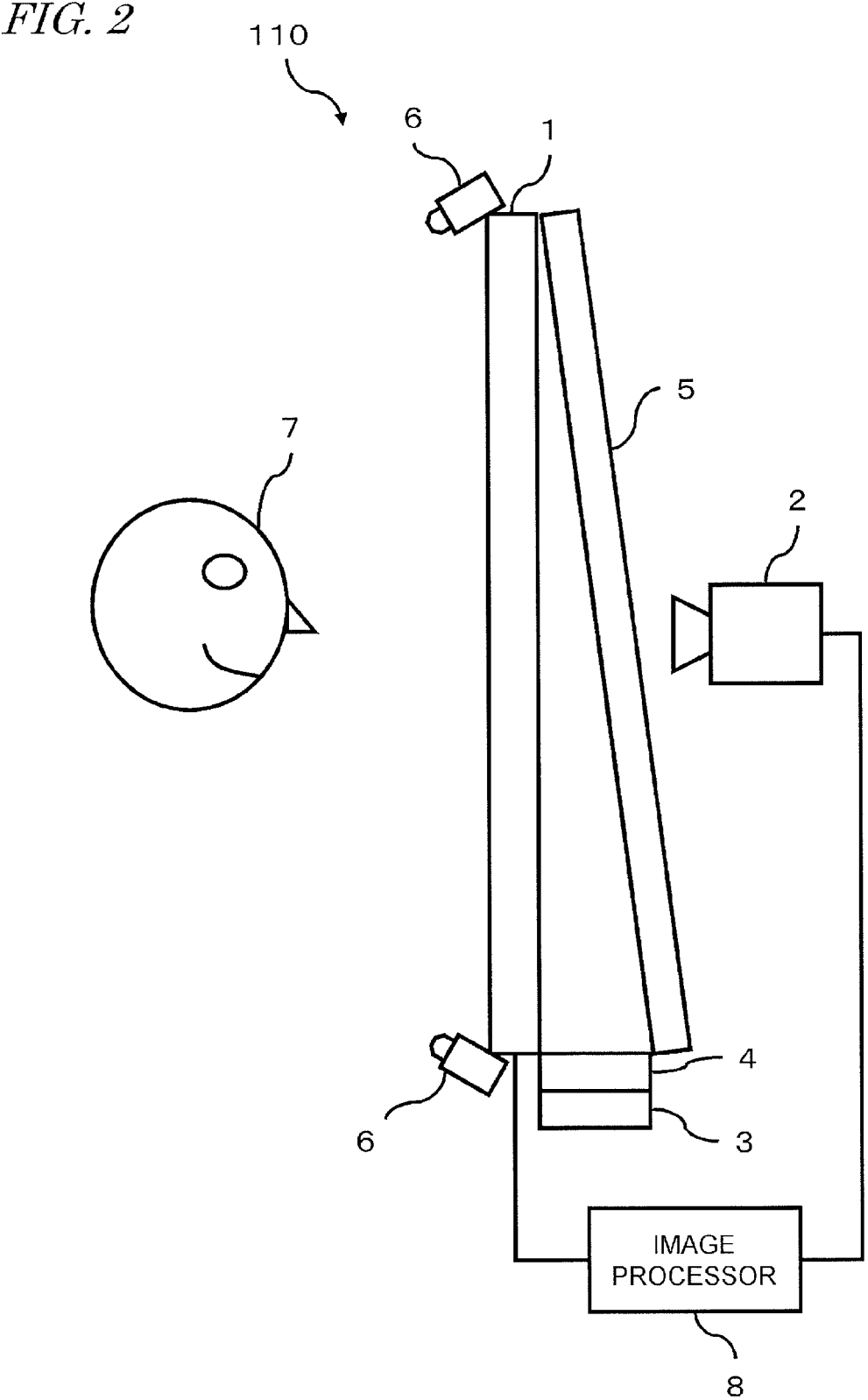
FIG. 2 illustrates a configuration for an image capture-display device as a first embodiment of the present disclosure.

FIG. 2 illustrates a general configuration for an image capture-display device 110 as a first embodiment of the present disclosure. The image capture-display device 110 may function as an electronic mirror which displays an image of the subject (user) 7 on a display while capturing the subject image. This image capture-display device 110 includes a transmissive LCD panel 1 with light transmissivity, a cold mirror 5 which is arranged behind the transmissive LCD panel 1, an infrared camera 2 which is arranged behind the cold mirror 5, a surface-emitting diode 3 which irradiates the cold mirror 5 with light, and an infrared cut filter 4 which is arranged between the surface-emitting diode 3 and the cold mirror 5. The image capture-display device 110 further includes two light-emitting diodes (infrared light sources) 6 which are arranged around the transmissive LCD panel 1 to emit infrared light, and an image processor 8 which is connected to the infrared camera 2 and the transmissive LCD panel 1. In this embodiment, the transmissive LCD panel 1, cold mirror 5, infrared camera 2, surface-emitting diode 3, infrared cut filter 4 and light-emitting diodes (infrared light sources) 6 function as the display panel, optical system (dichroic mirror), imaging device, light source, optical filter, and illumination sources described above, respectively. Also, the visible wavelength range (of approximately 350 to 750 nm) corresponds to the first wavelength range and the near-infrared wavelength range (of approximately 750 to 1400 nm) corresponds to the second wavelength range.

The transmissive LCD panel 1 is a display panel including a plurality of color filters which are arranged in columns and rows, a liquid crystal layer, and a transparent electrode. The transmissive LCD panel 1 can transmit visible light and infrared light. Based on the video data supplied from the image processor 8, the transmissive LCD panel 1 changes the orientations of liquid crystal molecules on a pixel-by-pixel basis, thereby displaying video. In this case, the video displayed may be real-time video of the user 7 him- or herself. Alternatively, the transmissive LCD panel 1 may be configured to display real-time video of a person being shot at a remote location or video or still picture that has been recorded. Optionally, the transmissive LCD panel 1 may be replaced with a different kind of light-transmitting display with a similar characteristic.

Figure 3A:
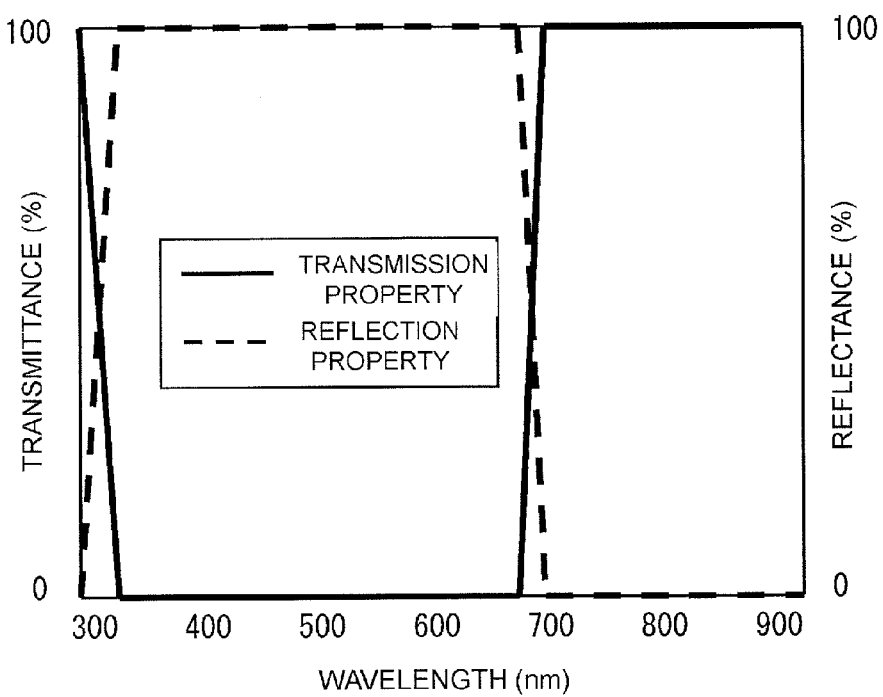
FIG. 3A shows an exemplary transmission property of an infrared cut filter.
Figure 3B:
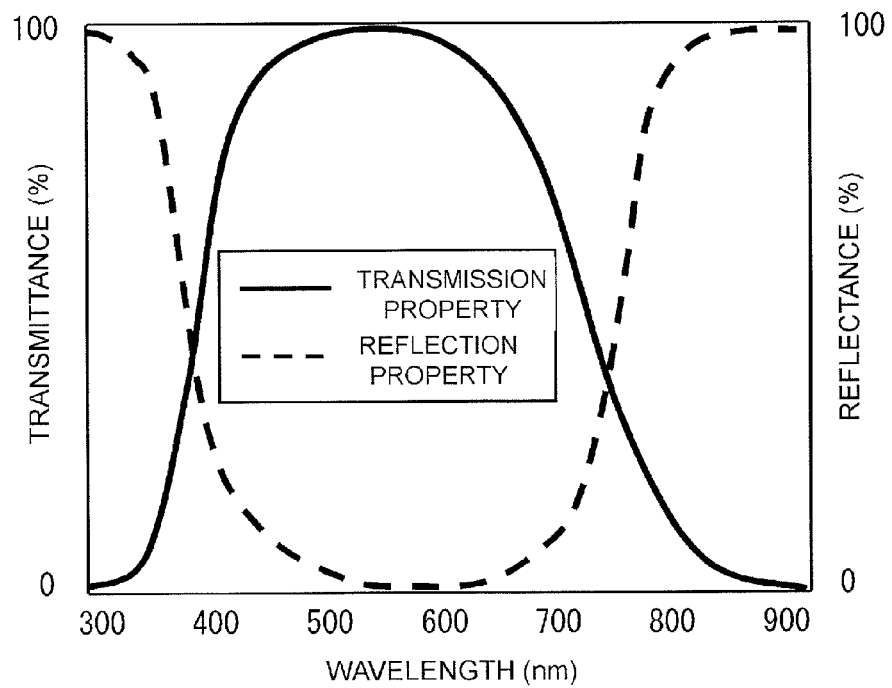
FIG. 3B shows another exemplary transmission property of the infrared cut filter.

The cold mirror 5 is a dichroic mirror which has the property of reflecting light falling within the visible wavelength range and transmitting light falling within the infrared wavelength range. The cold mirror 5 may be made by coating a glass substrate with a stack of multiple dielectric films having mutually different refractive indices. By adjusting the refractive indices and thicknesses of the respective dielectric layers, the wavelength ranges of the light beams to be reflected and transmitted can be controlled. The cold mirror 5 may have the reflection and transmission properties shown in FIG. 3A, for example. In FIG. 3A, the cold mirror 5 is supposed to have a transmittance of almost 100% with respect to visible light falling within the wavelength range of approximately 350 to 650 nm and have a transmittance of almost 0% with respect to infrared light falling within the wavelength range of approximately 700 nm or more and ultraviolet light falling within the wavelength range of approximately 300 nm or less. However, the cold mirror 5 does not always have to have such properties. Alternatively, the cold mirror 5 may also have an overall transmittance (i.e., the integral of the spectral transmittance with respect to the wavelength) of 70% or more with respect to light falling within the visible wavelength range and an overall transmittance of 30% or less with respect to the near-infrared light. For example, a cold mirror (dichroic mirror) with the transmission and reflection properties shown in FIG. 3B may be adopted as an optical system.

The cold mirror 5 reflects the visible radiation that has been emitted from the surface-emitting diode 3 and transmitted through the infrared cut filter 4 and makes it incident on the transmissive LCD panel 1, thereby playing the role of a backlight for the transmissive LCD panel 1. Also, the cold mirror 5 passes the infrared light that has come from the user 7, entered the transmissive LCD panel 1 and then been transmitted through the LCD panel 1 toward the infrared camera 2. Since the visible radiation that has come from the infrared camera 2 and has been incident on the cold mirror 5 is reflected back toward the infrared camera 2, the infrared camera 2 is never visible for the transmissive LCD panel 1.

Figure 4A:
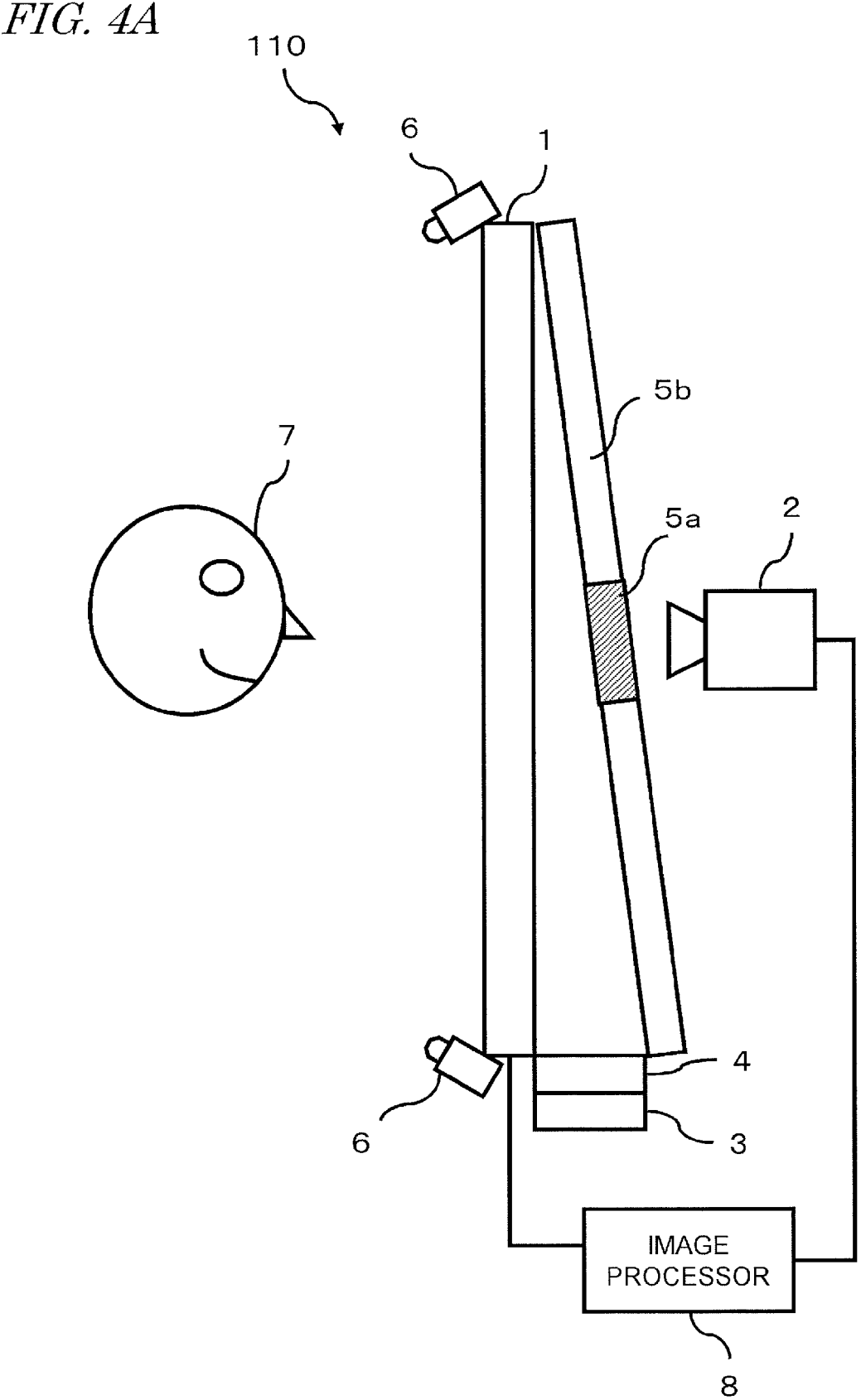
FIG. 4A illustrates a modified example of the image capture-display device of the first embodiment.
Figure 4B:
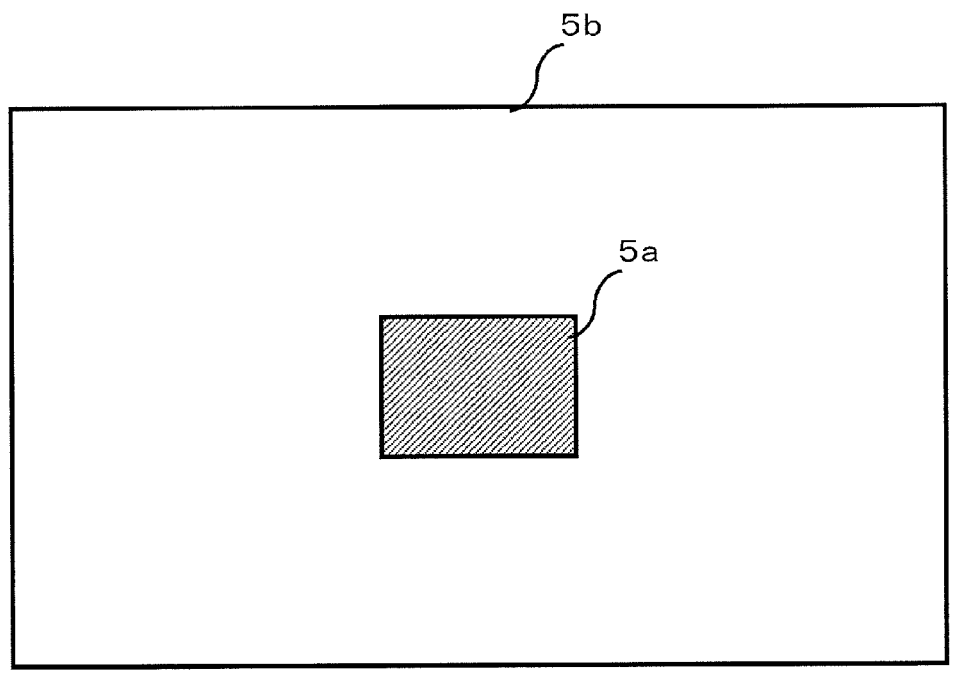
FIG. 4B is a plan view illustrating a cold mirror for use in the modified example of the image capture-display device of the first embodiment.

Optionally, only a portion of the optical system 5 that faces the infrared camera 2 may function as the cold mirror 5 and the rest of the optical system 5 may be a reflective mirror which reflects incoming light, for example. That is to say, a combination of a cold mirror 5a and a reflective mirror 5b which surrounds the cold mirror 5a may be used as the optical system 5 as shown in FIG. 4A. FIG. 4B is a front view schematically illustrating such an optical system. In FIG. 4B, the infrared camera 2 may be arranged behind the shadowed member 5a. Also, the upper end portion of the cold mirror 5 shown in FIG. 4A is in contact with the upper end portion of the transmissive LCD panel 1 and its principal surface is tilted with respect to the display screen of the transmissive LCD panel 1. However, the principal surface of the cold mirror 5 does not have to be tilted with respect to the display screen of the LCD panel 1. Even if the cold mirror 5 is arranged parallel to the transmissive LCD panel 1, the position and orientation of the surface-emitting diode 3 just need to be adjusted so that visible radiation is directed toward the transmissive LCD panel efficiently.

The infrared camera 2 is an imaging device which is sensitive to infrared light with a longer wavelength than visible light. The infrared camera 2 is suitably implemented as a combination of an image sensor such as a CCD (charge-coupled device) or CMOS (complementary metal oxide semiconductor) image sensor and an infrared ray transmitting filter which transmits only infrared light and filters out visible light. The infrared camera 2 outputs an image signal that has been generated by capturing an image to the image processor 8.

The infrared camera 2 may be arranged so as to face the user 7 with the transmissive LCD panel 1 and cold mirror 5 interposed between them. As a result, the line of sight of the user 7 who is displayed on the transmissive LCD panel 1 becomes straight forward, thus overcoming the problem that the line of sight of the user 7 displayed on the screen is not in line with his or her own line of sight. The infrared camera 2 is typically arranged on, but may slightly shift from, a perpendicular line that passes through the center of the display screen of the transmissive LCD panel 1.

The surface-emitting diode 3 is a light source which is configured to emit light including a light beam falling within the visible wavelength range. Optionally, the surface-emitting diode 3 may be replaced with any other kind of light source such as an incandescent light bulb or a cold cathode ray tube. The light emitted from the surface-emitting diode 3 may include not only visible light components but also infrared light components as well. That is why the infrared cut filter 4 is arranged after the surface-emitting diode 3.

Figure 5A:
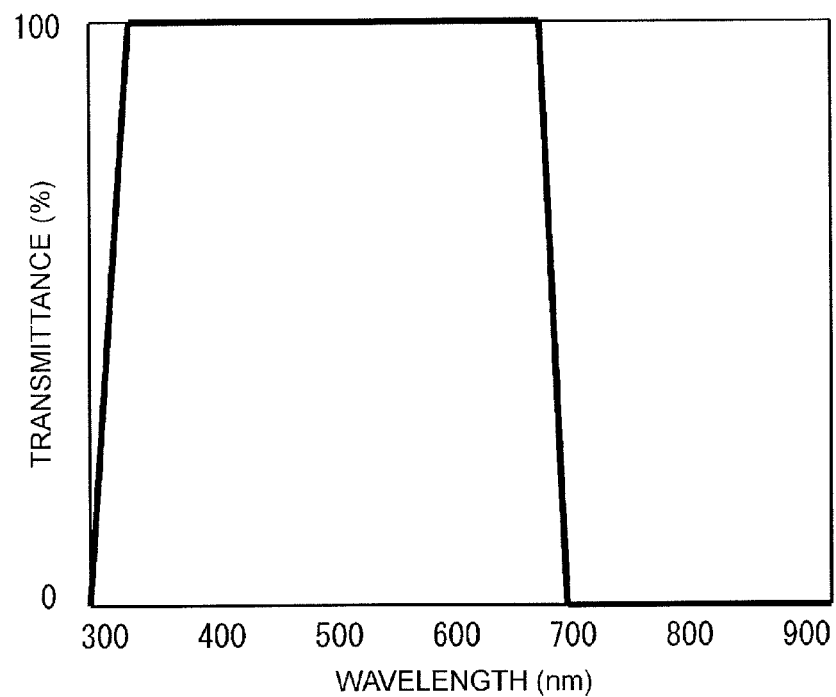
FIG. 5A shows exemplary reflection and transmission properties of a cold mirror.
Figure 5B:
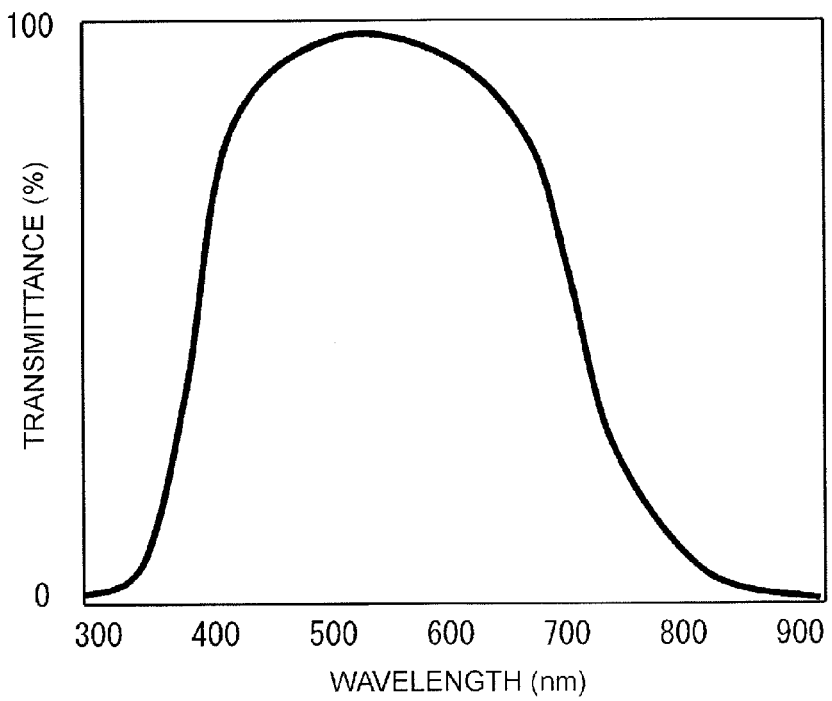
FIG. 5B shows other exemplary reflection and transmission properties of the cold mirror.

The infrared cut filter 4 is an optical filter having the property of filtering out infrared components from the incoming light and transmitting visible light. FIG. 5A shows an exemplary spectral transmittance characteristic of the infrared cut filter 4. In the example shown in FIG. 5A, the infrared cut filter 4 is supposed to have a transmittance of almost 100% with respect to light falling within the wavelength range of 300 to 700 nm (mostly visible radiation) and have a transmittance of almost 0% with respect to infrared or ultraviolet light falling within the other wavelength ranges. However, the infrared cut filter 4 does not always have to have such properties. Alternatively, an infrared cut filter having the spectral transmittance characteristic shown in FIG. 5B may also be used. Any optical filter may be used as the infrared cut filter 4 as long as the optical filter is designed to filter out 70% or more of the light falling within the infrared wavelength range and transmit 70% or more of the light falling within the visible wavelength range. By providing the infrared cut filter 4, the infrared components included in the light emitted from the surface-emitting diode 3 are filtered out and visible light components reach the cold mirror 5. Although the infrared cut filter 4 of this embodiment is supposed to be separated from the light source (i.e., the surface-emitting diode 3), the infrared cut filter may also form part of the light source.

Since the light emitted from the surface-emitting diode 3 has its infrared components filtered out by passing through the infrared cut filter 4, an image can be captured using the infrared camera 2 with the surface-emitting diode 3 kept ON. Consequently, control of the light source which should be carried out in a conventional device is no longer needed, which is advantageous.

In this embodiment, two light-emitting diodes (infrared light sources) 6 that emit infrared light are arranged beside the transmissive LCD panel 1. The infrared light sources 6 are arranged to irradiate the user 7 who is located right in front of the transmissive LCD panel 1 with infrared light. As a result, even if the quantity of infrared light is insufficient when only the infrared light included in external light is available, a sufficient quantity of infrared light that has come from the user 7 can be incident on the infrared camera 2. These two infrared light sources 6 may be, but does not have to be, arranged symmetrically with respect to the center of the display screen of the transmissive LCD panel 1. In addition, the number of the infrared light sources 6 to provide does not have to be two. As long as at least one infrared light source is provided, the lack of the infrared light can be remedied.

Figure 6A:
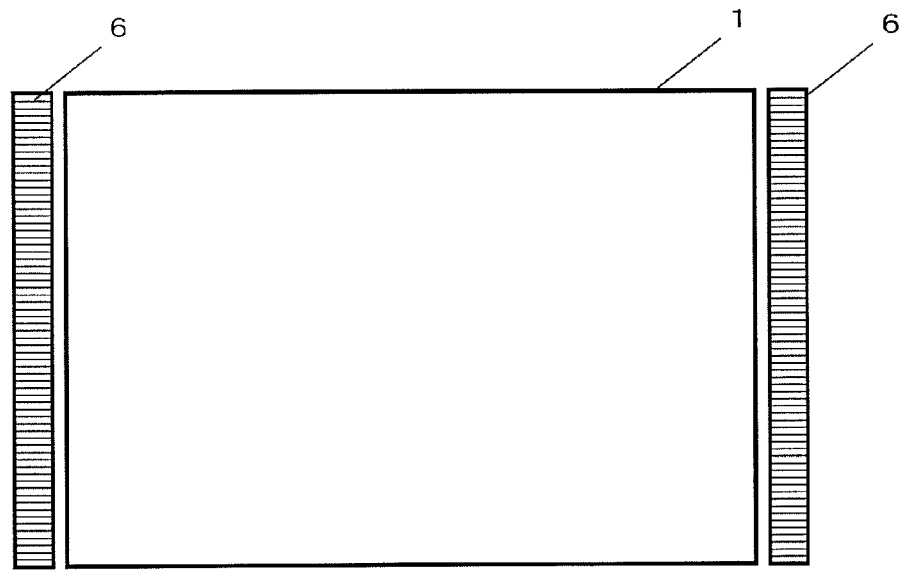
FIG. 6A is a schematic representation illustrating a modified example of an infrared light source 6.
Figure 6B:
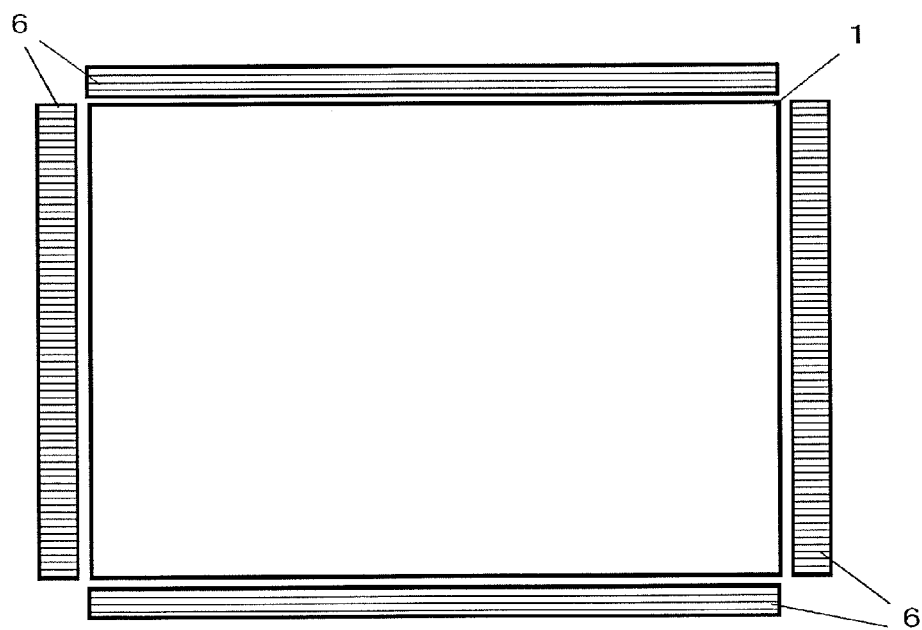
FIG. 6B is a schematic representation illustrating another modified example of the infrared light source 6.

FIGS. 6A and 6B illustrate other exemplary configurations for the infrared light source 6. In the example illustrated in FIG. 6A, two vertically elongated infrared light sources 6 are arranged on the right- and left-hand sides of the transmissive LCD panel 1. Alternatively, two horizontally elongated infrared light sources 6 may be arranged over and under the transmissive LCD panel 1. In the example illustrated in FIG. 6B, two horizontally elongated infrared light sources 6 are arranged over and under the transmissive LCD panel 1 and two vertically elongated infrared light sources 6 are arranged on the right- and left-hand sides of the transmissive LCD panel 1. Although four infrared light sources 6 are arranged separately in this example, a single illumination source which is configured to surround the transmissive LCD panel 1 may also be provided as well.

The infrared light emitted from the infrared light source 6 is reflected from the user 7, transmitted through the transmissive LCD panel 1 and the cold mirror 5, and then incident on the infrared camera 2. By providing the infrared light source 6, the infrared light incident on the infrared camera 2 is amplified, and therefore, a sharper image can be captured.

The image capture-display device 110 of this embodiment further includes an image processor 8, which is electrically connected to the infrared camera 2 and the transmissive LCD panel 1 and which generates image data to be displayed on the transmissive LCD panel 1 based on an image signal (infrared image data) supplied from the infrared camera 2. The image processor 8 is suitably implemented as a combination of some hardware component such as a known digital signal processor (DSP) and software (computer program) stored in a memory (not shown), for example. Alternatively, the image processor 8 may also be implemented as a dedicated image processing circuit as well.

The image processor 8 can generate color image data, of which the colors vary according to the temperature distribution to be calculated based on the infrared image data, for example, and can get such data displayed on the transmissive LCD panel 1. In addition, the image processor 8 can also adjust the size and location of the image data to be displayed on the transmissive LCD panel 1.

Optionally, the image processor 8 may also be configured to perform rangefinding by the TOF (time of flight) method. Specifically, the image processor 8 may calculate the distance to the user 7 by measuring the amount of time it has taken for the infrared light emitted from the infrared light source 6 and reflected from the user 7 to reach the infrared camera 2. And based on such distance information, a distance image, of which the luminance varies according to the distance, may be generated. Furthermore, by recognizing the face or the eyes based on the image data obtained by the infrared camera 2, the image processor 8 can also locate the user 7. If these pieces of information about the distance and location of the user 7 are used, the location and size of the image to be displayed on the LCD panel 1 can also be adjusted.

It should be noted that the image capture-display device 110 of this embodiment may include not just the elements shown in FIG. 2 but also control circuitry to control the operations of the respective components, a memory to store various kinds of data, a communications interface to communicate with an external network, a power circuit, a loudspeaker, a user interface and other additional components. However, description thereof will be omitted herein because none of them are essential components that would make it difficult to understand how this embodiment works unless they were described in detail.

As can be seen from the foregoing description, in the image capture-display device 110 of this embodiment, the infrared cut filter 4 is arranged after the surface-emitting diode 3, and therefore, the infrared light emitted from the surface-emitting diode 3 does not enter the infrared camera 2. That is why unlike the device of Japanese Laid-Open Patent Publication No. 2007-298547, there is no need to control the light source anymore. In addition, by using the cold mirror 5, the surface-emitting diode 3 can function as a backlight for the transmissive LCD panel 1 and an image can be captured from behind the LCD panel 1. According to such a configuration, video can be displayed while being captured without performing a complicated control, and the line of sight of the user 7 in front of the display can be aligned with that of the image of the user 7 being displayed on the display (LCD panel 1), which is an effect that no conventional device can achieve.

Embodiment 2

Figure 7:
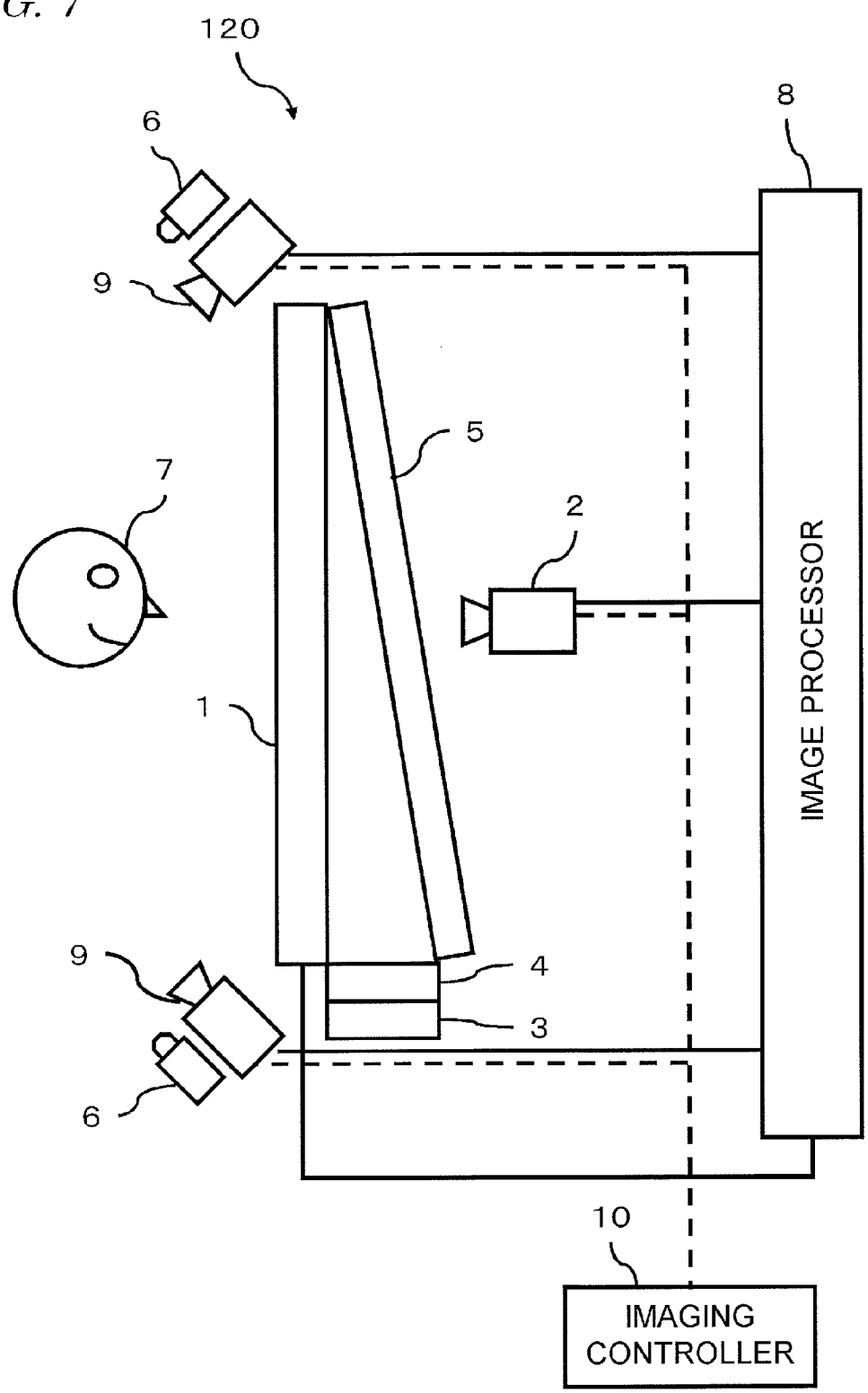
FIG. 7 illustrates a configuration for an image capture-display device according to a second embodiment of the present disclosure.

FIG. 7 illustrates a general configuration for an image capture-display device 120 as a second embodiment. In FIG. 7, any component also included in the image capture-display device 110 shown in FIG. 2 and having substantially the same function as its counterpart is identified by the same reference numeral. The image capture-display device 120 of this embodiment includes visible cameras (color imaging devices) 9 to get a color image signal and an imaging controller 10 to control the respective imaging devices, which is a difference from the image capture-display device 110 of the first embodiment. In the other respects, however, the device of this embodiment is the same as its counterpart of the first embodiment. Thus, the following description of this embodiment will be focused on only the difference from the first embodiment, and their common features will not be described all over again to avoid redundancies.

The visible cameras 9 are imaging devices which are sensitive to visible light. In this embodiment, two visible cameras 9 are arranged around the transmissive LCD panel 1. Those visible cameras 9 are arranged to face the user 7 who is located right in front of the transmissive LCD panel 1. The two visible cameras 9 may be, but does not have to be, arranged symmetrically with respect to the center of the display screen of the LCD panel 1. Also, the number of the visible cameras 9 to provide does not have to be two. But at least one visible camera 9 needs to be provided. Although an infrared light source 6 is arranged in this embodiment in the vicinity of each of those visible cameras 9, such an arrangement does not always have to be adopted. Instead, the visible camera 9 and the infrared light source 6 may also be integrated together.

The infrared camera 2 and the two visible cameras 9 are electrically connected to the imaging controller 10, which generates a sync signal to control the image capturing timings by the infrared camera 2 and the two visible cameras 9 and sends it to those cameras. As a result, image frames can be obtained from those cameras at the same time. The imaging controller 10 may be implemented as either a combination of a processor such as a CPU and a control program that is stored in a memory (not shown) or a dedicated controller.

The infrared camera 2 and the two visible cameras 9 are connected to the transmissive LCD panel 1 via the image processor 8. The image data that has been obtained by the infrared camera 2 and the two visible cameras 9 is sent to the image processor 8.

Based on the infrared image data supplied from the infrared camera 2 and the color image data supplied from the two visible cameras 9, the image processor 8 generates color image data to be displayed on the transmissive LCD panel 1. By performing the image processing disclosed in Japanese Laid-Open Patent Publication No. 2008-205839, for example, the image processor 8 can generate color image data (as a synthetic color image signal) in which the infrared image data and the color image data are synthesized together. The entire disclosure of Japanese Laid-Open Patent Publication No. 2008-205839 is hereby incorporated by reference. Specifically, first, the color image data that has been obtained from the two visible cameras 9 is transformed into image data in which the distortion corresponding to the tilt angle defined by the visible cameras 9 with respect to the user 7 has been corrected. Next, the corrected image data and the image data obtained from the infrared camera 2 are synthesized together.

As a result, a color image similar to the one that would be obtained by shooting the user 7 who is located in front of the display screen can be generated.

In addition, by adopting the TOF method that has already been described for the first embodiment, information about the distance to the user 7 can be obtained as a piece of three-dimensional information. By reference to this three-dimensional information, the image processor 8 can also generate three-dimensional color image data of the user 7. For example, by applying texture mapping for use in CG technologies to the three-dimensional information thus obtained, three-dimensional color image data can be generated. Specifically, by creating a three-dimensional object to be represented as a polygon, including information about how the vertices, edges and planes are connected together, based on the three-dimensional information thus obtained and by mapping a texture to be obtained from the color image data (attaching it like a sheet of wall paper) onto the surfaces, a three-dimensional color image can be generated.

As can be seen from the foregoing description, according to this embodiment, a color image can be obtained by at least one color imaging device (visible camera 9), and therefore, a color image which is equivalent to what will be obtained by shooting the user 7 who is located right in front of the camera can be obtained by synthesizing the color image and the infrared image together. As a result, even without performing any complicated control, video can be displayed while being captured, and the line of sight of the user 7 who is located in front of the display screen can be aligned with that of the image of the user 7 displayed on the display (i.e., the transmissive LCD panel 1), which is an effect that would not be achieved by any conventional image capture-display device.

Embodiment 3

Figure 8:
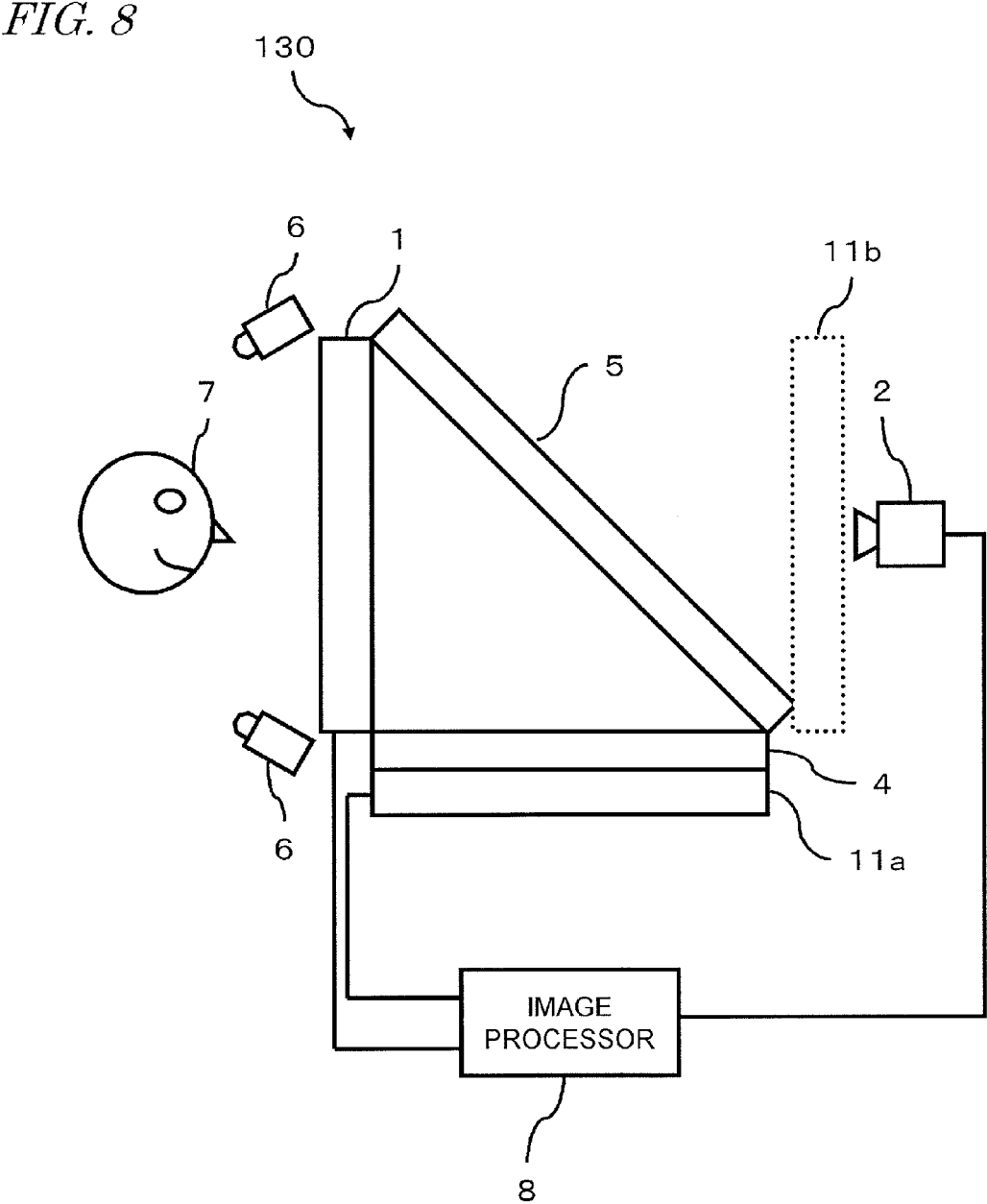
FIG. 8 illustrates a configuration for an image capture-display device according to a third embodiment of the present disclosure.

FIG. 8 illustrates a configuration for an image capture-display device 130 as a third embodiment of the present disclosure. In FIG. 8, any component also included in the image capture-display device shown in FIG. 2 or 7 and having substantially the same function as its counterpart is identified by the same reference numeral and description thereof will be omitted herein.

The image capture-display device 130 of this embodiment includes a color display panel 11a as the light source. As the color display panel 11a, an LCD panel, a plasma display panel, an organic EL display panel or any of various other kinds of displays which can conduct a display operation in colors may be used.

The color display panel 11a is provided as a light source in order to compensate for the insufficient coloring ability of the transmissive LCD panel 1 by irradiating the LCD panel 1, from behind it, with light representing the video synchronized with what is going to be displayed on the LCD panel 1.

The color display panel 11a is arranged so as to define a tilt angle of 90 degrees with respect to the transmissive LCD panel 1, and is electrically connected to the image processor 8.

The cold mirror 5 is arranged so as to define a tilt angle of 45 degrees with respect to the transmissive LCD panel 1 and reflect the light produced by the video being displayed on the color display panel 11a toward the transmissive LCD panel 1. As a result, to the user's (7) eye, the video displayed on the color display panel 11a will look as if the video were being displayed on the color display panel 11b shown in FIG. 8.

The image processor 8 generates image data to be displayed on the transmissive LCD panel 1 and the color display panel 11a based on the infrared image data supplied from the infrared camera 2. The image data to be displayed on the transmissive LCD panel 1 and the image data to be displayed on the color display panel 11a have the same contents but different sizes. The image data to be displayed on the transmissive LCD panel 1 is obtained by zooming out of the image data to be displayed on the color display panel 11a so that the video displayed on the transmissive LCD panel 1 and the video displayed on the virtual color display panel 11b will look having the same size and the same location to the user's (7) eye. The zoom power varies according to the distance from the user 7 to the infrared camera 2. In this manner, the image processor 8 gets synchronized video displayed on the transmissive LCD panel 1 and color display panel 11a. That is why the image processor 8 may be called a "display controller".

According to such a configuration, the light produced by the color display panel 11a can compensate for the color information of the transmissive LCD panel 1, thus improving the coloring ability of the transmissive LCD panel 1. As in the second embodiment described above, the visible camera 9 and the imaging controller 10 may also be provided in this embodiment, too.

Embodiment 4

Figure 9:
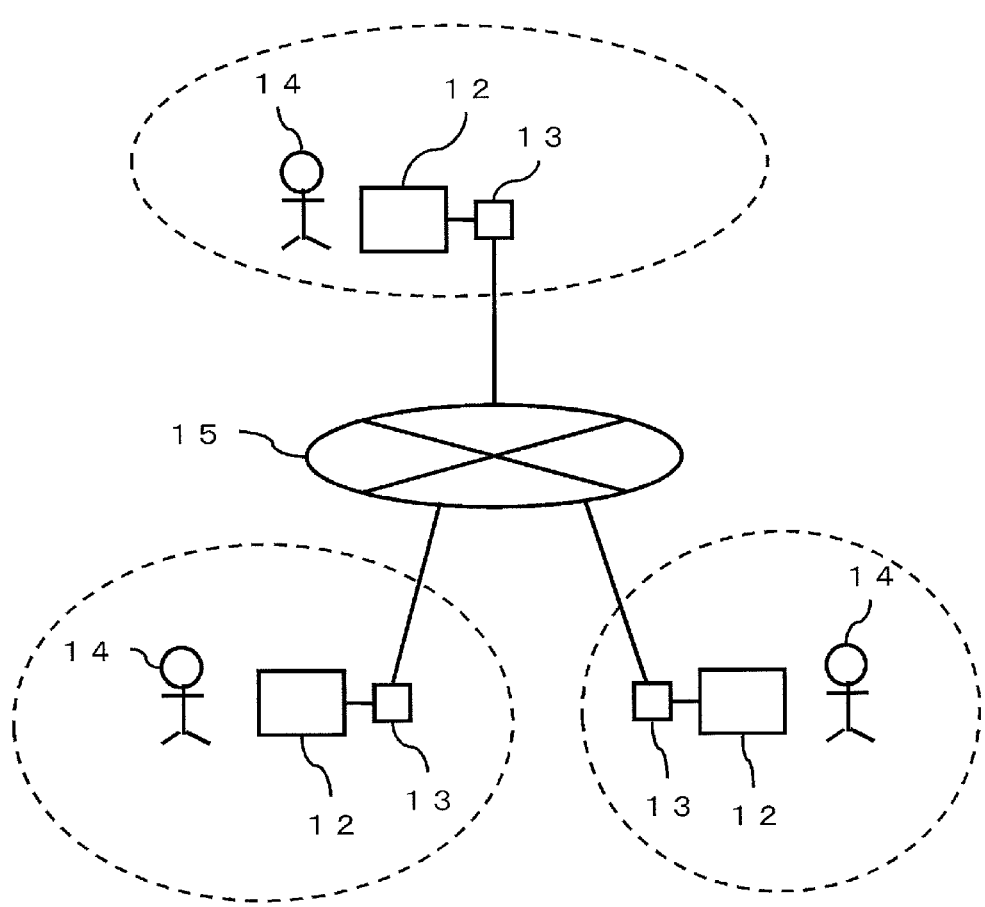
FIG. 9 illustrates a configuration for a remote communications system according to a fourth embodiment of the present disclosure.

FIG. 9 illustrates an exemplary configuration for a remote communications system as a fourth embodiment of the present disclosure. The remote communications system of this embodiment includes image capture-display devices 12 which are provided at respective sites and routers 13 which are used to connect those devices 12 to a network 15. Examples of the network 15 include the Internet, a wide area network, and a dedicated communications line. The remote communications system of this embodiment allows the users 14 of the image capture-display devices 12 at multiple different sites to make remote communications such as video chatting with each other.

Figure 10:
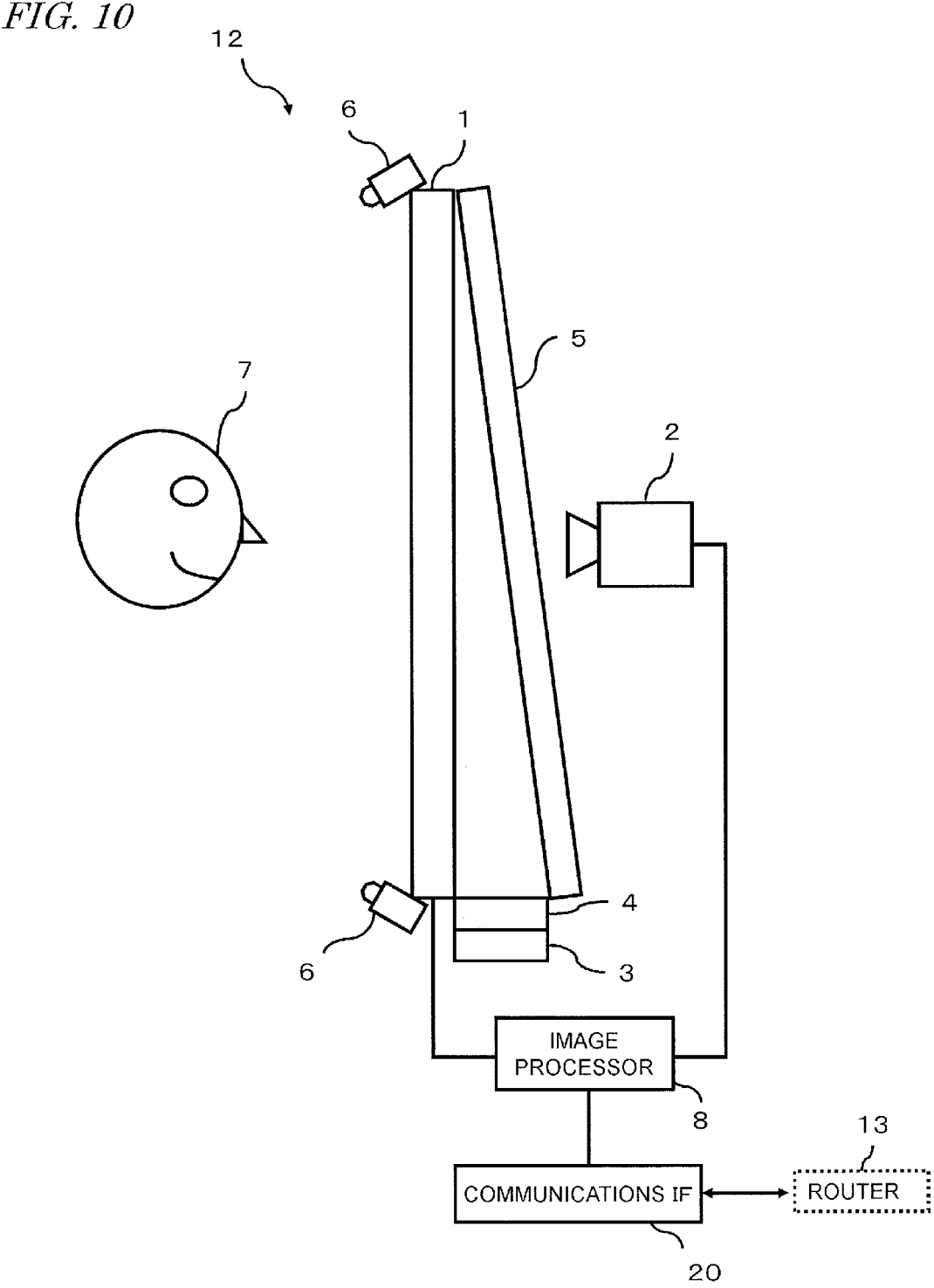
FIG. 10 illustrates a configuration for an image capture-display device according to the fourth embodiment of the present disclosure.

FIG. 10 illustrates an exemplary configuration for the image capture-display device 12 of this embodiment. The image capture-display device 12 shown in FIG. 10 includes not only every component of the image capture-display device 110 of the first embodiment but also a communications IF 20 as well, which may be a known communications circuit such as a network interface card and which makes communications with the router 13. In other words, the communications IF 20 sends out the image signal supplied from the imaging device (infrared camera) to the network, and receives another image signal from the network, via the router 13. In this manner, image information, audio information or any other kind of data can be transmitted and received. In this embodiment, the image capture-display device 12 has the same configuration as its counterpart of the first embodiment described above except for the communications IF 20. However, the image capture-display device 12 may have the same configuration as its counterpart of the second or third embodiment, too.

To make this system operate as a remote communications system, microphones, loudspeakers, and other members are actually needed. However, description of those inessential members will be omitted herein because none of them have anything to do with the technique of the present disclosure.

According to this embodiment, the image capture-display devices 12 at respective sites are connected together over the network 15 and via the routers 13. As a result, a plurality of users 14 can communicate their video and audio with each other. With such a configuration, the users 14 can communicate with each other with the line of sight of one user 14 who is located at any of these sites aligned with that of the on-screen image of another user 14 who is located at another site.

Other Embodiments

Although Embodiments 1 to 4 have been described herein as just examples of the technique of the present disclosure, various modifications, replacements, additions or omissions can be readily made on those embodiments as needed and the present disclosure is intended to cover all of those variations. Also, a new embodiment can also be created by combining respective elements that have been described for those embodiments disclosed herein. Thus, some of those other embodiments will be described.

In the first through fourth embodiments described above, the cold mirror 5 is supposed to be provided as an optical system with the properties of reflecting and transmitting light. However, the optical system does not have to be a cold mirror. For example, a half mirror having the property of transmitting approximately 50% of the visible light and infrared light and reflecting the other 50% may also be used as the optical system. In that case, however, about a half of the infrared light transmitted through the transmissive LCD panel 1 will be reflected from the half mirror, and therefore, the light intensity of the infrared light source 6 should be increased. Likewise, a half of the light emitted from the surface-emitting diode 3 will also be transmitted toward the imaging device, and therefore, the intensity of the light should be increased, too.

Also, in the first to fourth embodiments, the infrared camera 2 is supposed to be provided as an imaging device which is sensitive to light with a wavelength falling outside of the visible wavelength range. However, this configuration is just an example. Alternatively, an ultraviolet camera which is sensitive to ultraviolet light having a shorter wavelength than visible light may also be provided in place of the infrared camera 2. In that case, a mirror which transmits ultraviolet light and reflects visible radiation may be provided as the optical system having the properties of reflecting and transmitting light, an ultraviolet cut filter which cuts ultraviolet light may be provided in place of the infrared cut filter 4, and an ultraviolet light source such as a light-emitting diode that emits an ultraviolet ray may be provided instead of the infrared light source 6. Light falling within the color blue to near-ultraviolet wavelength ranges is easily attenuated by melamine which is produced in a spotted region of a person's face, and therefore, can be used to detect spots. That is why if an ultraviolet camera which is sensitive to an ultraviolet ray falling within the near-ultraviolet wavelength range is used, the image processor 8 can detect spots on the skin based on the image data obtained from the ultraviolet camera, generate image data indicating the locations of those spots, and present the data on the display.

Furthermore, the optical system does not have to be the dichroic mirror or the half mirror, but may also have any other configuration as long as the optical system is arranged on the optical path of a light beam falling within a first wavelength range that has been emitted from a light source and has the property of reflecting at least partially the light beam falling within the first wavelength range and transmitting at least partially a light beam falling within a second wavelength range that is different from the first wavelength range. The first wavelength range does not have to be all of the visible wavelength range but may also be only a part of the visible wavelength range. The second wavelength range does not have to be a near-infrared wavelength range or a near-ultraviolet wavelength range but may also be a part of the visible wavelength range. For example, a light beam falling within the colors red and green wavelength ranges (e.g., from about 500 nm to about 700 nm) may be used as the light beam falling within the first wavelength range and the wavelength range of its complementary color (i.e., the color blue) from about 350 nm to about 500 nm may be used as the second wavelength range. As described above, since a blue ray close to an ultraviolet ray can be used effectively to detect spots, those spots can also be detected in this exemplary configuration, too. In this exemplary configuration, the backlight of the display panel will not emit white light but yellow light. That is why to avoid such a situation, a color blue light source may be separately provided behind the display panel. In that case, to prevent the blue light emitted from the light source from entering the imaging device, a dichroic mirror which transmits the blue light may be provided for only a portion that faces the imaging device and a reflective mirror may be arranged around the dichroic mirror.

In the embodiments described above, an illumination source such as an infrared light source or an ultraviolet light source is supposed to be provided. However, the illumination source is not an essential component. Under an environment where there is plenty of light falling within the wavelength range for use to capture an image in, there is no need to provide such an illumination source.

An image capture-display device according to the present disclosure can be used in a virtual mirror system or videoconference system which uses a display and a camera.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2013-119675 filed Jun. 6, 2013, the entire contents of which are hereby incorporated by reference.

What is claimed is:

1. An image capture-display device comprising:
   a light source configured to emit a light beam falling within a first wavelength range;
   an optical system arranged on an optical path of the light beam falling within the first wavelength range that has been emitted from the light source, and configured to reflect at least partially the light beam falling within the first wavelength range and transmit at least partially a light beam falling within a second wavelength range that is different from the first wavelength range;
   a display panel arranged on the optical path of the light beam falling within the first wavelength range that has been emitted from the light source and reflected by the optical system, and configured to transmit the light beam falling within the first wavelength range and the light beam falling within the second wavelength range; and
   an imaging device arranged opposite from the display panel with respect to the optical system and configured to receive the light beam falling within the second wavelength range that has been transmitted through the display panel and the optical system and output an image signal.

2. The image capture-display device of claim 1, wherein the optical system is a dichroic mirror that has a property of reflecting the light beam falling within the first wavelength range and transmitting the light beam falling within the second wavelength range.

3. The image capture-display device of claim 1, wherein the optical system is a half mirror.

4. The image capture-display device of claim 1, wherein the light beam falling within the first wavelength range is visible light, and
the light beam falling within the second wavelength range is either infrared light or ultraviolet light.

5. The image capture-display device of claim 1, wherein the light source is configured to emit the light beam falling within the first wavelength range and the light beam falling within the second wavelength range, and
the device further comprises an optical filter arranged between the light source and the optical system and configured to transmit the light beam falling within the first wavelength range and not to transmit the light beam falling within the second wavelength range.

6. The image capture-display device of claim 1, wherein the display panel is configured to display an image based on an image signal that has been supplied from the imaging device.

7. The image capture-display device of claim 1, further comprising at least one illumination source arranged so as to irradiate a subject with the light beam falling within the second wavelength range.

8. The image capture-display device of claim 7, wherein the at least one illumination source is arranged beside the display panel.

9. The image capture-display device claim 1, wherein the light beam falling within the first wavelength range is visible light and the light beam falling within the second wavelength range is infrared light, and
the device further comprises at least one color imaging device configured to receive visible light that has come from a subject and output at least one color image signal.

10. The image capture-display device of claim 9, further comprising:
an imaging controller configured to output a control signal to synchronize image capturing timings by the imaging device and the at least one color imaging device; and
an image processor configured to generate a synthetic color image signal based on the image signal supplied from the imaging device and the at least one color image signal supplied from the at least one color imaging device.

11. The image capture-display device of claim 9, wherein the at least one color imaging device includes two color imaging devices.

12. The image capture-display device of claim 11, wherein the two color imaging devices are arranged symmetrically with respect to the center of the display panel.

13. The image capture-display device of claim 9, further comprising at least one infrared light source arranged in the vicinity of the at least one color imaging device and configured to irradiate the subject with infrared light.

14. The image capture-display device of claim 1, wherein the light source includes a color display panel configured to display a color image corresponding to the image displayed on the display panel.

15. The image capture-display device of claim 14, further comprising a display controller configured to display synchronized video on the color display panel and the display panel in the light source.

16. The image capture-display device of claim 1, further comprising a communications circuit configured to transmit the image signal that has been supplied from the imaging device to a network and to receive another image signal via the network,
wherein the display panel is configured to display an image based on that another image signal that has been received by the communications circuit.

17. A remote communications system comprising:
the image capture-display device of claim 16; and
a router configured to connect the image capture-display device to another image capture-display device over a network.

* * * * *